United States Patent [19]

Bernacchi

[11] Patent Number: 4,708,005

[45] Date of Patent: Nov. 24, 1987

[54] ANTI-THEFT DEVICE FOR AN AUTOMOBILE VEHICLE

[76] Inventor: Armand Bernacchi, Avenue des Vallées, F-74200 Thonon-les-Bains, France

[21] Appl. No.: 807,365

[22] Filed: Dec. 10, 1985

[51] Int. Cl.⁴ ............................................ E05B 65/12
[52] U.S. Cl. ...................................... 70/238; 70/199; 70/247; 70/254; 70/202
[58] Field of Search ................................. 70/198–203, 70/211, 237, 238, 249, 245, 247, 254, DIG. 49; 180/287, 336; 192/4 R

[56] References Cited

U.S. PATENT DOCUMENTS

| 1,362,377 | 12/1920 | Weidner | 70/203 |
| 1,388,149 | 8/1921 | Friedrich | 70/203 |
| 3,822,573 | 7/1974 | Meyers | 70/200 |
| 4,076,095 | 2/1978 | Adamski | 70/202 X |
| 4,299,361 | 11/1981 | Webb | 70/DIG. 49 |
| 4,439,758 | 3/1984 | Cantley | 70/DIG. 49 |

FOREIGN PATENT DOCUMENTS

| 807760 | 7/1951 | Fed. Rep. of Germany | 70/199 |
| 857000 | 11/1952 | Fed. Rep. of Germany | 70/238 |
| 2704478 | 8/1978 | Fed. Rep. of Germany | 70/DIG. 49 |
| 609750 | 8/1926 | France | 70/202 |
| 925217 | 8/1947 | France | 70/199 |
| 1053903 | 2/1954 | France | 70/198 |
| 464388 | 6/1951 | Italy | 70/202 |
| 865204 | 4/1961 | United Kingdom | 70/199 |
| 1131583 | 10/1968 | United Kingdom | 70/202 |
| 2021499 | 12/1979 | United Kingdom | 70/203 |
| 2142889 | 1/1985 | United Kingdom | 70/247 |
| 0850440 | 8/1981 | U.S.S.R. | 70/238 |

Primary Examiner—Robert L. Wolfe
Assistant Examiner—Suzanne L. Dino
Attorney, Agent, or Firm—Handal & Morofsky

[57] ABSTRACT

An anti-theft device for an automobile vehicle comprises a casing which is fastened to the handbrake lever so that the casing can be pivoted relative to the lever between an inoperative position allowing operation of the handbrake lever, and an operative position in which, when the handbrake lever is in the handbrake engaged position, the casing envelops and immobilizes the handbrake lever. The casing carries a two part annular component which can be closed and locked around the gear lever when the casing is in the operative position, thereby preventing operation of the gear lever as well as the handbrake lever.

6 Claims, 7 Drawing Figures

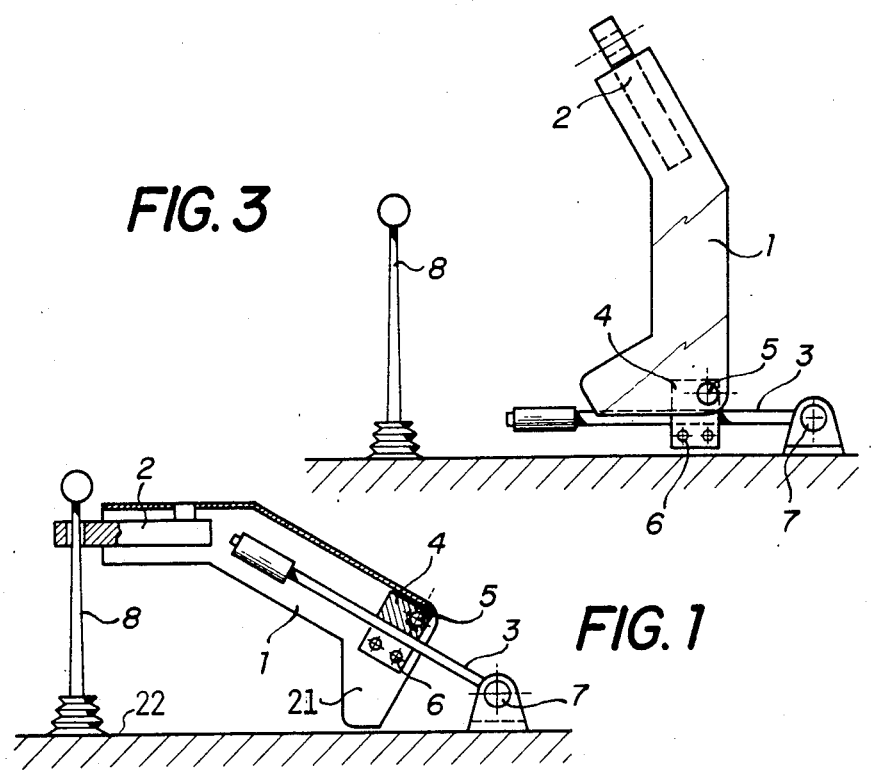
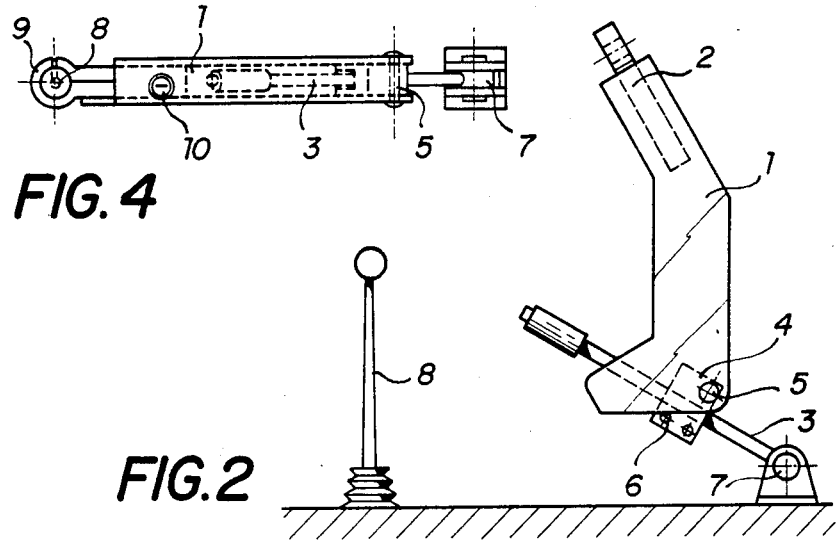
FIG. 3
FIG. 1
FIG. 4
FIG. 2

ANTI-THEFT DEVICE FOR AN AUTOMOBILE VEHICLE

This invention relates to an anti-theft device for an automobile vehicle, the aim of which is to prevent movement of the vehicle when a malefactor has succeeded in gaining entry to it.

Anti-theft devices are well known which operate by blocking the locks of the vehicle doors or by blocking the steering wheel, and it is currently common to fit automobile vehicles with one of these types of devices as standard. The stage has also been reached where more or less complicated and practicable anti-theft systems have been devised, for example in which the steering wheel can be dismantled and taken away by the owner of the vehicle, or in which the wheels can be blocked by kinds of brake shoes or similar elements.

These devices, either because they are well known to thieves or because they are inconvenient to use, do not offer sufficient guarantee of success.

A principle object of the present invention is to provide a vehicle anti-theft device which is novel and which is capable of keeping a vehicle in an immobilized position in a particularly simple and economic manner.

This and other objects of the invention are achieved by a device which, according to the invention, comprises immobilizing means which is adapted to put the handbrake lever out of use when the lever is in the handbrake engaged position, and locking means attached to the handbrake lever immobilizing means for locking the immobilizing means to the gear lever to prevent operation of the gear lever.

According to a preferred embodiment of the invention, the immobilizing means comprises a casing forming a cover and enveloping the handbrake lever, the casing being secured to the handbrake lever so that the casing can be pivoted on the lever. For example, the casing may be secured to the handbrake lever by a clamping ring, with the pivot axis of the casing passing through the clamping ring at a position which is high with respect to the handbrake lever.

Preferably the locking means comprises an annular component in two parts arranged to engage around the gear lever and governed by a lock. With advantage, the annular component comprises a fixed part and a movable part which is slidable longitudinally in order to release the gear lever when the lock is open.

The lock may comprise a movable return member, a restoring spring which biasses the return member towards a blocking position where it prevents the movable part of the annular component from sliding open when the annular component is closed, and a stud which is movable between a position in which the restoring spring is free to push the return member to the blocking position, and a position in which the stud engages and displaces the return member from the blocking position to allow the movable part of the annular component to slide open.

Preferably, the fixed and movable parts of the annular component comprise, at their faces which engage when the annular component is closed, an assembly forming a mortise and tenon joint which prevents the annular component from being opened by force applied to it perpendicularly to the plane of the component.

Also, there may be associated with the lock an alarm which can be disconnected by a contact, itself possibly equipped with a lock, located, for example, beneath the dashboard.

The invention may be better understood by reference to the accompanying drawings which illustrate a preferred embodiment of the invention by way of example. In the drawings:

FIG. 1 is a sectional view of the device in its locking position;

FIG. 2 is a side view of the device showing the cover unlocked and tilted towards the rear to allow the handbrake to be released;

FIG. 3 is a view corresponding to FIG. 2, after the handbrake has been released;

FIG. 4 is a top plan view of the device in its locking position;

Figure 5:
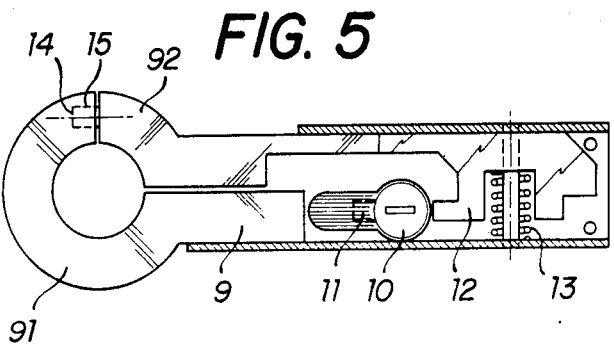
FIG. 5 is a part sectional view of the locking means of the device showing the annular component closed and locked in position.

As can be seen in FIGS. 1 to 4, the anti-theft device comprises a casing 1 which forms a cover and which is fixed onto the handbrake lever 3 of a vehicle by a clamping ring 4. The casing 1 is rivetted to the clamping ring 4 at a high position relative to the handbrake lever 3 so that the casing can pivot on the clamping ring about a pivot axis 5, and the clamping ring 4 is fixed to the handbrake lever 3 by screws 6. The brake lever 3 itself pivots about an axis 7, and therefore carries the casing 1 in its pivotal movement. As will be readily understood from FIGS. 1 and 4, the casing 1 forms a cover which completely envelops the handbrake lever 3, both at the sides and above, when the handbrake is engaged and the casing 1 is moved to its locking position. The casing may, for example, be a bar made from sheet metal of sufficient thickness, such as 3 mm or more.

The casing 1 is equipped with a locking bolt 2 comprising an annular component 9 which is arranged to engage around the gear change lever 8 of the vehicle when the casing is in the locking position, and which is governed by a lock 10. As will be seen from FIGS. 5 to 7, the annular component 9 is in two parts, a fixed part 91 and a movable part 92 which is slidable backwards and forwards respectively to open and close the annular component 9. The bolt 2 is locked (FIG. 5) when the annular component is closed and the lock 10 is turned to allow a return member 12 to move under the action of a spring 13 to a position in which it prevents the movable part 92 from sliding open. The bolt 2 is unlocked by inserting a key and turning the lock 10 through 180°, which causes a stud 11 to engage and retract the member 12 against the action of the spring 13 to allow the movable part 92 to slide open. It will also be noted that the fixed part 91 and the movable part 92 are equipped respectively with a mortise 14 and a corresponding tenon 15, which engage when the annular component is closed to prevent any lateral distortion of the movable part out of the plane of the annular component.

The device is used as follows: Before leaving the vehicle, the driver moves the handbrake lever 3 to engage the handbrake and pivots the cover 1 down from the position shown in FIG. 2 to the position shown in FIG. 1. The open annular component is located around the gear lever 8 and then closed and locked by turning the lock to the position shown in FIG. 5. A foot 21 is positioned adjacent the floor 22 as illustrated in FIG. 1. The device is thus locked in position, preventing operation of the gear lever and release of the handbrake.

Figure 6:
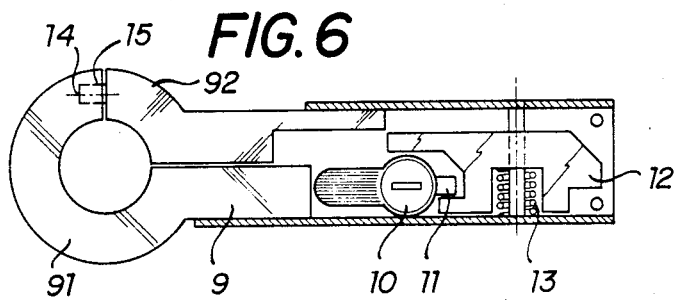
FIG. 6 is a view similar to FIG. 5 showing the annular component closed but unlocked; and, FIG. 7 is a view similar to FIG. 6, showing the annular component in its open position.
Figure 7:
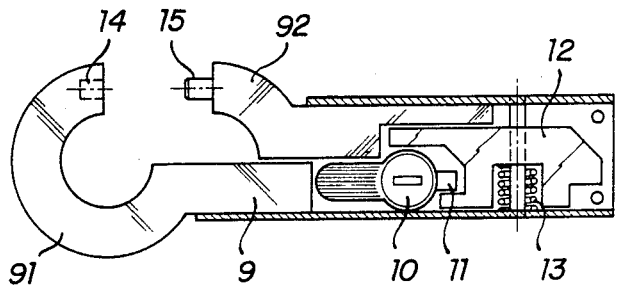

On returning and entering the vehicle, the driver inserts the key in the lock 10 and turns the lock through 180° to bring the stud 11 and the member 12 into the positions shown in FIG. 6. He then shifts the movable part 92 of the annular component 9 towards the rear in order to release the gear change lever 8, and raises the cover 1 by pivoting it about the axis 5 to the position shown in FIG. 2. It then only remains for him to disengage the handbrake lever 3 to come back to the start position illustrated in FIG. 3 in which the automobile vehicle is free to move.

The anti-theft device may be locked around the gear lever 8 when the latter is engaged in reverse. The vehicle would then only be able to make short jerky backward movements if, by accident, the motor contact was made and the force of the handbrake is not sufficient to hold the vehicle. Alternatively, locking may be carried out in first gear, in which case the vehicle could make, at most, only short jumps forwards. If locking is carried out with the gear lever 8 in a position corresponding to a high gear, for example fourth or fifth gear, it is then certain that the vehicle will not be able to start at all, since at the instant of engagement the starter motor will jam.

The bolt 2 is, of course, a safety bolt, and the lock 10 preferably has a double entry in order to permit the driver to unlock the anti-theft system if the main entry to the lock has been forced.

Finally, it is possible to provide an alarm system connected to any member of the anti-theft device, for example to the lock 10. This alarm would, of course, be disconnected by the driver before unlocking the anti-theft device, for which purpose a contact on the dashboard, preferably concealed, may be provided, as is already well known, it is also possible to use another lock.

As will have been understood, this anti-theft device can be used on any automobile vehicle in which the gear change lever and the handbrake lever are close to each other, notably vehicles in which these two controls are situated on the floor, and can be used equally well in vehicles with manual gearboxes and in vehicles with automatic gearboxes.

The anti-theft device can be easily installed in the vehicle by locating it, for example, between the two locking devices for the safety belts for the driver and front passenger. By the nature of its structure and by the ease with which it is fitted, the device is particularly inexpensive.

It will be noted, moreover, that the device cannot easily be forced when it is in its locking position. For example, any attempt to saw through it will give disappointing results, since both the axis of the handbrake lever and the bearing upon the gear lever, even though the latter may be engaged, are not capable of providing sufficient rigidity to act as a vice.

The fabrication and the dimensions of the casing may clearly be designed to suit different types of vehicles as a function of the clearance and space available.

I claim:

1. An anti-theft device for an automobile vehicle of the type including a handbrake lever movable between handbrake engaged and handbrake disengaged positions, and a gear shift lever, said anti-theft device consisting of immobilizing means attached to said handbrake lever and adapted to engage said handbrake lever of said vehicle to immobilize said handbrake lever when said lever is in said handbrake engaged position, and locking means mounted to said immobilizing means for locking said immobilizing means to said gear shift lever and preventing operation of said gear shift lever, wherein said immobilizing means comprises a casing forming a cover which pivotally envelopes and immobilizes said handbrake lever while in said engaged position and wherein said immobilizing means is a single rigid member which extends, in the locked position, between the gear shift lever and handbrake lever.

2. A device according to claim 1, wherein said immobilizing means comprise fastening means securing said casing to said handbrake lever consisting of a clamping ring securely fixed to said handbrake lever, and means pivotally connecting said casing to said clamping ring and defining a pivot axis at a position which is high with respect to said handbrake lever.

3. An anti-theft device for an automobile vehicle of the type including a handbrake lever movable between handbrake engaged and handbrake disengaged positions, and a gear shift lever, said anti-theft device consisting of immobilizing means attached to said handbrake lever and adapted to engage said handbrake lever of said vehicle to immobilize said handbrake lever when said lever is in said handbrake engaged position and wherein said immobilizing means is a single rigid member which extends, in the locked position, between the gear shift lever and handbrake lever and locking means mounted to said immobilizing means for locking said immobilizing means to said gear shift lever and preventing operation of said gear shift lever, wherein said locking means comprises an annular component in two parts adapted to close around said gear shift lever, one of said two parts fixed to said immobilizing means and the other of said two parts mounted on said immobilizing means and displaceable longitudinally to open and close said annular component, and a lock coupled to said other part to prevent the opening of said annular component when said lock is locked.

4. A device according to claim 3, wherein said fixed one part and said movable other part of said annular component define contact faces which engage when said annular component is closed, said contact faces including a mortise and tenon assembly for preventing said annular component from being opened by force in a direction perpendicular to the plane of said component.

5. A device according to claim 3, wherein said lock comprises a movable return member, a restoring spring biasing said return member towards a blocking position in which it prevents said movable second part of said annular component from sliding open when said component is closed, and a stud mounted on said lock, and movably by actuation of said lock between a position in which said spring is free to push said return member to said blocking position, and a position in which said stud engages and displaces said return member from said blocking position to allow said movable second part of said annular component to slide open.

6. A device as in claim 1 wherein said immobilizing means has a base portion by which it is attached to said handbrake lever and further comprises foot means secured to said base portion and configured and dimensioned to extend to a position proximate the floor of the automobile.

* * * * *